US005647168A

United States Patent [19]

Gilbert

[11] Patent Number: 5,647,168

[45] Date of Patent: Jul. 15, 1997

[54] FLAT TRAPEZOIDAL CONTAINER OF BRIGHTLY PRINTED THERMALLY SEALABLE FILM

[75] Inventor: Scott Robert Gilbert, Hinckley, Ohio

[73] Assignee: Professional Package Company, Strongsville, Ohio

[21] Appl. No.: 610,365

[22] Filed: Mar. 4, 1996

Related U.S. Application Data

[60] Continuation-in-part of Ser. No. 375,786, Jan. 20, 1995, Pat. No. 5,496,252, which is a division of Ser. No. 248,391, May 23, 1994, Pat. No. 5,388,695.

[51] Int. Cl.[6] .............................. A01G 9/02

[52] U.S. Cl. .............................. 47/72; 383/120

[58] Field of Search .............................. 47/72; 383/120, 383/123, 124, 104

[56] References Cited

U.S. PATENT DOCUMENTS

| | | | |
|---|---|---|---|
| 3,556,389 | 1/1971 | Gregoire | 224/53 |
| 3,580,486 | 5/1971 | Kugler | 383/120 |
| 4,297,811 | 11/1981 | Weder . | |
| 4,717,262 | 1/1988 | Roen | 383/120 |
| 4,810,109 | 3/1989 | Castel | 383/120 |
| 5,074,675 | 12/1991 | Osgood | 383/120 |
| 5,235,782 | 8/1993 | Landan | 47/72 |
| 5,581,938 | 12/1996 | Weder | 47/72 |

FOREIGN PATENT DOCUMENTS

| | | | |
|---|---|---|---|
| 42319 | 6/1979 | Australia | 47/72 |
| 3911847 | 10/1990 | Germany | 47/72 |
| 1204647 | 9/1970 | United Kingdom | 47/72 |
| 2274542 | 11/1981 | United Kingdom | 47/72 |

*Primary Examiner*—Henry E. Raduazo
*Assistant Examiner*—Joanne C. Downs
*Attorney, Agent, or Firm*—Alfred D. Lobo

[57] ABSTRACT

A flat trapezoidal container provides a generally frustoconical single cavity for snugly sheathing a flower pot. The container is specifically dimensioned sheath a flower pot so as either (a) to leave therebeneath, a surplus of film in an transition zone which is concealable under the flower pot, or (b) form a hexagonal gusset in the bottom. The container is made from two flat panels of heat-sealable film, each shaped in the general form of a trapezium; or from a single web folded double. The lower portion of the container is ornamentally imprinted along a border extending beneath a generally lateral line above the longitudinal axis of the web; and, with a marker in the upper portion, identifies the contents, or provides instructions for their use or care. When the cavity is distended by being partially filled, the entire container, except for a transition zone, presents a smoothly arcuate surface of the frustum of a cone. The lower exterior portion is continuously printed with ornamental design elements without an interruption in the printing, such as is present as an elongated blank rectangle in prior art bags. The transparent upper portion is free from an elongated portion of the printed image near the edges, as in prior art containers. A method is disclosed for forming the printed container which method requires discarding the material for more than one-half of one container for each container made by thermally sealing the equally, but oppositely angulated sides of the trapeziums, and the shorter of the remaining parallel sides.

3 Claims, 6 Drawing Sheets

FLAT TRAPEZOIDAL CONTAINER OF BRIGHTLY PRINTED THERMALLY SEALABLE FILM

This application is a continuation-in-part of Ser. No. 08/375,786 filed Jan. 20, 1995 to issue as U.S. Pat. No. 5,496,252 on Mar. 5, 1996, which in turn is a divisional application of Ser. No. 08/248,391 filed May 23, 1994 issued as U.S. Pat. No. 5,388,695 on Feb. 14, 1995.

BACKGROUND OF THE INVENTION

This invention relates to a non-closable container having an open mouth defined by the upper edges of a pair of generally trapezoidal panels (referred to hereinafter as "trapezoidal" for brevity) heat-sealed along two edges of a pair of overlying webs, or along the side edges of a single web folded double, which side edges are not linear; and additionally, heat-sealed to form a bottom. The container exhibits a desired visual effect by a means which (a) includes coloration and decorative ornamentation, (b) forms an approximately trapezoidal configuration with essentially no thickness when collapsed, and a generally frustoconical shape when partially filled, and (c) suggests the appearance of a live plant when one is placed in a container of appropriate size. The container most preferably includes a static information-exhibiting means in the upper portion of its exterior surface, specifically modified by ornamented indicia which provides the static information. "Upper" portion refers to the transparent portion above a "lateral line" in a region lying in the range from about one-half to about two-thirds vertically above a liquid-impervious base which is the container's bottom. The "lateral line" refers to a line, preferably serrated or crenelated, preferably located above the vertical half-way distance between the upper and lower edges of the superimposed webs, but below one drawn through a point at a height two-thirds the vertical distance between the upper edge and the bottom, the line being nearer the upper edge than the bottom. The phrase "lower printed portion" refers to the ornamented printed portion in the area below the lateral line. The lower printed portion includes a base, a frustoconical portion and an outwardly flared generally frustoconical portion (referred to as "the outwardly flared portion" for brevity) which merges into the upper see-through portion.

In a particular embodiment, the container contains a potted plant, typically a live plant, in a conventional flower pot (in shape, the frustum of a cone) and visual information desired to be communicated to the user concerning the plant or the utilization of the plant, and the characters providing the information are preferably in contrasting colors.

Commercially acceptable containers in the market-place for the packaging of potted plants are required, not only to package the potted plant effectively, but to help sell it to the consumer. Preferably, the container helps to entice the consumer to purchase the plant on the spur of the moment. Such plants are easily portable from the point-of-sale because they weigh less than about 4.54 Kg (10 lb), and when packaged in the container, may be lifted and moved by grasping the top of the container holding the plant. An appropriately decorative container serves not only to make the sale, but to identify the goods therein, to allow air circulation over the goods, and, if desired, provide information about the plant contained, and/or instructions with respect to how to care for the plant.

The terms "trapezium", "trapezoid" and "trapezoidal" are used herein as equivalents to denote an approximate quadrilateral having two parallel upper and lower sides, the lower side being shorter than the upper, with the remaining two side sides being equally angulated, but oppositely directed. The equally angulated sides may be linear, forming a geometrically well-defined trapezium when the panels of the container are laid flat, or the equally angulated sides may be non-linear in profile. A non-linear profile is obtained when the lower portion of the container includes an outwardly-flared portion which commences to flare from a location which would be near the rim, preferably just above the rim of the pot ("pot line") to be sheathed. The outwardly flared profile at its top, merges into a linear portion of the side, and at its bottom, at the pot line, the outwardly flared profile merges into a line defining one side of the frustoconical portion of the container. The line defining one side of the frustoconical portion of the container then merges into an angulated linear portion which, in a particular embodiment forms a gusseted bottom.

The closed end of the container is referred to as the "base" despite being nearer the apex of the triangle (which the container would form if the angulated sides were extended to intersect) than the unsealed longer sides which form the open upper end or "mouth" of the container, because, in use, its mouth is uppermost.

Accordingly, this invention more particularly relates to a novel decoratively ornamented non-closable trapezoidal container formed from a web of essentially transparent synthetic resinous film (referred to herein as "plastic film") uniquely printed on the container's exterior surface, in the lower portion thereof, preferably with high-gloss inks of contrasting color in only the lower printed portion, preferably containing a varnish, or overlaid with a coat of varnish, the upper portion of the container being essentially transparent (hence referred to as "the see-through portion") and preferably, foraminous; and, to a continuous method of making the container from twin superimposed webs, each printed in substantially the same way, or, from a single web folded along near its central longitudinal axis to produce substantially the same result as the twin webs.

By "high-gloss" ink is meant one which when viewed as a printed layer has a gloss index in the range from about 70–98. By "essentially transparent" film is meant "permeable to visible light" such that at least about 90% of the surface area of the upper portion of the container is free from printing which interferes with the transparency of the upper portion.

Flat containers, generally referred to as "plastic bags" are currently made in a variety of shapes and sizes, including generally trapezoidal as well as rectangular bags, by joining together along three sides, along the entire length of each side, upper and lower webs of transparent heat-sealable film printed with the tradename of the seller, the trademark, a pattern of stripes and squares or other geometric design, or a likeness of the contents, for example, a poinsettia plant. To my knowledge, such bags are made from heat-sealable polyolefin film or polyester film, typically thin polyethylene or cast polypropylene film, and printed with inks against the transparent background so that a profusion of printing is scattered in separate regions across the entire container, or, only a minor proportion of the lower portion of the web is printed with a discontinuous layer of printing ink applied in a substantially uniform coating.

In some instances, a web of film made opaque with an ultrathin, non-self-supporting, reflective layer of bright metal, deposited by known techniques and referred to as "metallized film", is overprinted with a single color with substantially transparent ink. Hereafter, for brevity, the ultrathin, non-self-supporting, reflective layer of bright metal is referred to as "the ultrathin layer" to distinguish it from foil which is self-supporting. The thickness of the ultrathin layer, most preferably of aluminum, ranges from about 0.5 micron (0.5μ) to about 4μ, and the coated film has an optical density of <4 (less than 4). By "substantially transparent ink" is meant an ink which is permeable to at least 20%, and preferably a major portion, of visible light incident upon it. Trapezoidal bags formed of metallized film have no upper portion which is essentially transparent, nor are they completely covered with printing ink in their lower portion. Minor portions of metal have been removed from within both the lower and upper printed areas in prior art bags but this amount removed in the upper printed area is typically less than about 20% of the metallized surface, so that the upper area is not essentially transparent.

Such printed metallized flat trapezoidal bags are used to package vegetables and fruits at grocery stores, and in a host of other applications including for advertising at ball games where a bag may be used as a rain hat, by inverting the bag over one's head. Ornamented containers printed with high-gloss inks, and the method of making them, are the subject matter of the parent application the aforementioned U.S. Pat. No. '252 patent the disclosure of which is incorporated by reference thereto as if fully set forth herein.

Recognizing the importance of providing a foil wrap which serves as a marketing tool, and of providing a more attractive package for goods, U.S. Pat. No. 4,297,811 to Donald E. Weder (U.S. class 47/subclass 72) provides a decorative wrapping material in the form of a flexible self-supporting aluminum foil panel having a multicolor appearance. One surface of the aluminum foil is covered with relatively thick and relatively thin layers of ink of a single color, spaced apart by uncoated areas of metallic foil, to produce an effect referred to as "racing stripes". The other surface of the aluminum foil is laminated to a thin layer of plastic material. The function of the metallic foil is to emphasize the delineation between the inked areas and to enhance the variation in color intensity between adjacent areas. The overriding function of the U.S. Pat. No. '811 wrap is to attract the attention of a customer easily attracted by wrappings, if not goods, that glitter.

A container to jacket a live potted plant is imprinted with desirable design elements such as leaves, preferably generic to the plant. The light-permeable upper portion of the container allows (a) identification of the plant which must be clearly visible in normal indoor or outdoor lighting, with the naked eye, (b) disseminates the fragrance of the plant, and (c) provides ambient air for transpiration.

A trapezoidal bag, referred to as a Combined Shipping and Packaging Envelope for a Potted Plant, is disclosed in Des. 259,333 to Charbonneau, showing a printed lower portion contrasted with a white upper portion the margins of which contain portions of the same printed color which covers the lower printed portion. These marginal printed portions are referred to as "print overlap" or "overlap". No prior art trapezoidal container has been formed in which printed images cover substantially its entire lower portion of a defined lower portion of the container with a continuous layer of printing ink, the remaining upper portion being free of overlap. By "substantially its entire lower portion" is meant that the lower printed portion is covered with ink over from about 90% to 100% of the area of the lower portion. The lowest portion near the container's bottom edge may be preserved in an unprinted condition to facilitate the bottom being heat-sealed in the unprinted region. Prior art trapezoidal bags have been partially printed in their lower portions with a discontinuous layer of printing ink typically covering less than about 50% of their lower portions, or have deliberately maintained designated unprinted areas in the lower printed portion.

No prior art trapezoidal container has (i) only its entire lower portion printed with a high gloss ink and, (ii) its upper portion permeable to visible light. More particularly, no prior art container has (i) only its entire lower portion covered with the ultrathin layer, and sequentially overprinted with contrasting colors of a transparent ink, including a varnish to produce a high-gloss printed surface, and, (ii) its upper portion permeable to visible light. No prior art trapezoidal container has (i) only its entire lower portion sequentially printed with contrasting colors of essentially opaque inks, including a varnish to produce a high-gloss printed surface, and, (ii) its upper portion permeable to visible light. It is conceded that, a printer of polyolefin film, who prints with high-gloss colored transparent inks on metallized film, or high-gloss opaque inks on transparent film, could print substantially the entire lower portion of a web with contrasting colors of high gloss ink, were he instructed to do so, and leave the upper portion unprinted. It is known that transparent ink, printed on the ultrathin layer in a layer from about 1–10μ thick, allows visible light reflected from the ultrathin layer to pass through the ink, giving the printed image a distinctive bright metallic look.

Similarly, one skilled in the art of designing and constructing containers from synthetic resins would recognize the desirability of maintaining an upper transparent portion for visual inspection of its contents but would have no reason to cover the entire lower portion with a high-gloss ink, or with a high-gloss ink brightened by the addition of reflective varnishes which are preferably mutually soluble with the inks. Much less likely would he be likely to consider using a metallized heat-sealable plastic film, overprinting it to cover the entire lower portion of a trapezoidal flat bag he wished to make, then overlaying the printed portion with varnish. Unexpectedly, the varnish serves two additional functions besides providing high-gloss: it allows etching away only the unwanted portions of the ultrathin layer, and, it provides protection against scuffing of the otherwise unprotected relatively abrasion-prone inks on the exposed exterior printed surface.

Specifically, there was no recognition in the bag-making art, of the desirability of printing the entire lower portion of a web with high-gloss inks in juxtapositioned regions having different thicknesses, yet to restrict the printing beneath a generally lateral line of longitudinal demarcation between the printed lower portion and the transparent upper portion, for any reason; nor was there any reason in the art to make a multiplicity of trapezoidal bags from a pair of webs, with the restriction that each bag be free of blank or elongated rectangular unprinted portions ("racing stripes") in the lower portion, or, overlap in the upper portion; or, any reason in the art to provide a marker for information directly connected to the use or care of the goods.

Because of the conventional method of making prior art flat trapezoidal bags with essentially no wasted stock, no bag has both, a completely printed lower portion, and, a transparent upper portion. Prior art flat trapezoidal bags have either a racing stripe in the lower portion, or, overlap in the upper transparent portion, as will be explained in greater detail below. In a mass of conventionally printed bags having an upper portion which is transparent, the bags are not identical to one another in that the racing stripes vary in width at the margins of the lower portion of the trapezium;

or, in printed bags having their lower portions essentially completely printed, the widths of the overlap vary at the margins in the upper transparent portions. Though only a single bag, conventionally printed in only its lower half, in essentially the entire portion thereof (no racing stripe, no unprinted portions), with the upper portion transparent (no overlap in the margins), could have been individually made from appropriately printed stock, whether a pair of webs, or a single web folded over on itself once, by wasting the remainder of the stock on either side, such a method of making a bag would not be considered for a commercial bag-making machine which must make a multiplicity of bags with a minimum of wasted stock. In bag-making, the stock is fed essentially continuously to the bag-making machine. The method of this invention permits making a mass of containers, the mass comprising a multiplicity of individual, identically uniquely printed containers, by deliberately wasting stock, more than one-half that used to make the container, but limiting the waste to less stock than is used to make the container.

With respect to prior art bags made with a gusseted bottom, a typical grocery bag of plastic film is side-gusseted so that it does not provide a flat bottom. Rectangular bags of plastic film which are bottom-gusseted and provide a flat bottom, such as a bag disclosed in U.S. Pat. No. 4,717,262, are also commonly available. All such bags, whether or not gusseted, are formed sequentially from a moving web, the seals on the sides of any one bag being common to the sides of bags on either side of the one bag. This conventional sequence is specifically selected so that no material is wasted between rectangular bags. Side-gusseted bags and bottom-gusseted rectangular bags of the prior art have gussets formed without an angulated seal, or sealed at different angles from the gussets formed in the container of this invention. Moreover, the method disclosed herein of forming the gusseted base of the container with its unique characteristics is unlike any prior art method for forming a bottom gusseted container for a flower pot.

SUMMARY OF THE INVENTION

It has been discovered that, due to the unique method of forming a series of containers for a flower pot, which method requires that a substantial portion of the film be discarded, a generally trapezoidal ("trapezoidal" hereinafter, for brevity) uniquely printed container may be formed which has an upper ("see-through") portion free of printing in the side margins, and a lower portion which is printed. The lower portion includes (i) a base on which the bottom of a pot rests; above the base, and, (ii) a frustoconical portion which snugly jackets the pot. In addition, above the frustoconical portion, the lower portion may include (iii) an outwardly-flared portion commencing to flare near the rim of the pot ("the pot line"), which outwardly-flared portion merges into the see-through portion. The base may be formed by a linear seal at the base of the frustoconical portion so that, after a pot is inserted, the base is not flat but forms a transition zone; alternatively, in "one-piece" construction from a folded web, a bottom-gusseted base may be formed by a pair of gussets with appropriately angulated, oppositely, outwardly directed sealing lines which form, when the pleat between the gussets is extended, a flat hexagon with its front and rear (with the container laid flat) parallel sides longer than its remaining angulated sides. In this configuration, a portion of the gusseted base within the remaining angulated sides extends onto the lower portion of the flower pot. The base of the pot therefore is not congruently confined upon a substantially cylindrical base formed by the opposed twin gussets. Such gussets can only be formed when the containers are made serially in the same direction, throwing away the intermediate portions, as described in the aforementioned U.S. Pat. No. '252 patent. One can only consider gusseting the bottom as described, after having decided to waste the portions of web intermediate the containers being gusseted. No prior art trapezoidal container has been suggested having only its entire lower portion printed, irrespective of the type of printing, also having its bottom is gusseted as described herein to fit a flower pot of specific size.

It is critical that a printed web from which the container is to be formed, have only one surface (the exterior surface, referred to as "the treated surface") printed with high-gloss ink, the other (the interior surface) being untreated (referred to as "the untreated surface"). Formation of a gusseted bottom is by heat sealing through an inwardly folded pleat so as to form a disruptable bond between the outer printed surfaces of the folded gusset, but an essentially permanent seal between interior surfaces of the film, at the edges of the triangular portions forming each gusset. By a "disruptable bond" is meant a seal which is made without welding one surface to the other, and which seal can be disrupted with little effort, for example, by manually pulling the film on either side apart, without damaging the film adjacent the broken seal; or by inserting a finger between the bonded surfaces. By "essentially permanent seal" is meant a heat-seal or weld which is not disrupted without damaging the film adjacent the weld, or without incurring a high risk of doing so.

In one embodiment, a pair of panels from at least one web of thin, self-supporting plastic film, decoratively and informationally printed, may be heat-sealed along its oppositely angulated outwardly flared sides, and bottom, to form a flat, uniquely, brightly printed trapezoidal container without a handle, which container provides a single non-sealable cavity. The cavity does not exist when the container is empty and the panels lie flat, congruently one upon the other. The container, which may also be formed from a single web, folded double, serves not only to identify the goods contained and to attract the eye, but to protect the goods prior to their being used at their destination. In another embodiment, the container is necessarily formed from a web folded double when a gusseted bottom is required so as to lie flat under a pot, with corners of the gusset overlying the lower outer surface of the pot in conforming relationship.

In the particular embodiment disclosed herein, the container is used to carry a plant growing in soil; or, with the upper "see-through" portion removed, the container may provide a snug, substantially water-impermeable jacket around the pot of a live potted plant. The thickness of the empty container is the combined thickness of the pair of panels, each imprinted in a lateral plane to the same extent relative to an axis at right angles to the longitudinal axis, with decorative, preferably plant-identifying images in multiple contrasting colors with high-gloss printing. When the container has a gusseted base, the thickness of the base, lying flat, is four times that of the film.

It has further been discovered that a web folded double, which is printed in at least about one-half a longitudinally divided width thereof with printing ink, may be formed into a uniquely printed trapezoidal container with a gusseted bottom, to display a pattern of images in only the lower portion of the container, without a racing stripe or other unprinted portion, and without an overlap of elongated rectangular print in the margins of the see-through portion of the trapezoid, provided the web is printed so as to waste at least half of the web resulting in finished containers; and, that a hexagonal gusset formed to snugly sheath the bottom of the pot with triangular corners of the gusset conforming to the sides of the pot, requires that the oppositely directed but equally angulated weld lines which form the gusset be in the range from 30° to 60°. Optionally, the sides of the lower portion may include an outwardly-flared portion commencing to flare from near the pot line of the container. Most preferably the ink is a high-gloss ink, preferably differing thicknesses of high-gloss inks of contrasting colors.

Trapezoidal panels are formed from either (a) a pair of printed webs by being linearly sealed along each of three sides, or (b) a single web folded double along its central longitudinal axis, and sealed on its two oppositely angulated sides. To form a gusseted bottom the single web folded double is additionally provided with an inward fold and the fold is heat-sealed between opposed hot dies to form the required angles.

It is therefore a first general object of this invention to provide a flat decoratively printed trapezoidal container of plastic film, the container having particular dimensional characteristics and ornamental printing, to form a single, generally frustoconical cavity with only two panels. In one embodiment in which the base of the container is gusseted, and in another in which the base is not, a potted plant inserted in the container, pot first, keeps the mouth of the container open. Because the container with a gusseted bottom is made by a novel method, the container's lower printed portion is free from a "racing stripe" which would break up the continuity of the printed image around the entire circumferential area of the lower portion of the container, and is also free of the "overlap" which in conventional manufacture, indicates a tolerance of poor quality in addition to partially impeding the view of the contents in the upper see-through portion of the container.

The container with a non-gusseted bottom is made from two flat panels of film stock, each panel cut from a continuously printed web and simultaneously sealed to form a trapezium in which the lower portion includes outwardly-flared sides; each panel being of substantially the same shape and area. The lower portion of the container is printed on its exterior surface with high-gloss ink, preferably sequentially at multiple printing stations. The ink may be opaque in one or more layers, to provide a pattern of repetitive elements in multiple contrasting colors, each contrasting color consisting of at least one layer of ink. Juxtapositioned colors in different dry thicknesses, in the range from 0.5μ–10μ, are preferably overlaid with a layer of varnish having a dry thickness in the range from 1–12μ to provide a gloss index in the range from 70–98.

Still further, the level to which the printed image rises in the lower portion may include a "marker" printed in a small region of the upper portion. Preferably, the marker provides additional information, such as identification of the plant, instructions as to its care, or instructions for the use of the container itself.

Linear seals to form the side edges of the container, and to form its bottom, are impervious to water. When the cavity is distended by a potted plant, the outer frustoconical surface of the pot is snugly sheathed by the frustoconical portion of the container. A flower pot sheathed around its frustoconical surface with a container of this invention, presents a smoothly arcuate surface, free of creases or folds. When the pot sheathed with a non-gusseted container, is not resting on a planar surface, but held so that the base hangs freely, an empty transition zone is formed under the base of the pot. The art has never suggested providing such a transition zone, formed only after a pot is inserted in the container, which transition zone is dimensioned so as to be hidden beneath the pot when it rests on its bottom without either destabilizing the assembly of container and sheathed flower pot, or having "ears" or excess plastic in some other form protruding from the circumference of the covered bottom of the flower pot presenting an inelegant appearance.

When linear seals form a base with a gusseted bottom, and the cavity is distended by a potted plant, the outer frustoconical surface of the pot is snugly sheathed by the lower frustoconical portion of the container as well as triangular portions on either side of the hexagonal gusset, each triangular portion arcuately overlying the lower frustoconical surface of the pot.

When the non-gusseted container is used to jacket a conventional, standard flower pot, it is critical that the container be dimensioned so that the bottom circumferential edge of the flower pot defines the upper line of demarcation between a frustoconical cavity filled with the flower pot and an empty transition zone, and that the transition zone be effectively concealable beneath the bottom of the flower pot when the container is set down on its bottom.

It is essential that the lower printed portion be free from elongated rectangular unprinted portions, that the upper portion be essentially transparent, and that the finished printing consist of juxtapositioned regions of layers of different thicknesses of high-gloss ink on the exterior surface of the walls of the container, either miscible with, or overlaid with a layer of multifunctional varnish; and, that the printing extend longitudinally from one side of the container to the other without interruption. It is most preferred that the upper see-through portion of the container be perforated to provide air circulation and to emphasize and promote the transparency of the upper portion; and, that it be manually detachable by tearing it off along multiple spaced-apart slitted perforations ("slits") generally laterally disposed, preferably in a series of serrations ("teeth") generally conforming to the lateral line of demarcation between the lower printed portion, and the upper see-through portion.

It is a specific object of this invention to provide the aforedescribed container for a living plant, in which container its bottom is gusseted, the printed portion may be outwardly flared or unflared, and the unprinted portion of the upper portion is provided with through-perforations to permit the living plant to breathe; the perforations may be provided by needles which produce microperforations, each having a circumferential ridge and a diameter in the range from about 0.25 mil (6.25μ) to 5 mil (125μ). Alternatively, the perforations may be relatively large holes in the range from about 4 mm to 12 mm in diameter, punched from the film with a punch having a sharp circumferential edge. The ratio of the area depleted by the perforations may range from about 5% to about 25% of the area of the upper portion and is insufficient to weaken the upper portion so greatly that a portion may be ripped off when it is manually gripped to carry the weight of the small goods in the container.

It is another specific object of this invention to provide a container for a living plant, in which container the lower printed portion is provided with a bright pattern, or images of bright leaves or flowers, or both, or other desirable graphical pattern, provided by differing colors of ink, or different thicknesses of the same ink whether opaque or not, to give the visual impression that the plant has foliage starting from the ground level, and no unhealthy foliage or flowers; and, the upper transparent portion is perforated.

The method of this invention, requires using webs, whether separate or formed by folding a web double, in which there is no mirror-image printing, and requires, for each container made, discarding trapezium-shaped portions of material sufficient to form more than half but less than a whole container. As before, each container is made sequentially by thermally sealing the equally, but oppositely angulated side edges of the trapeziums and either (a) the shorter of the remaining parallel sides to form a non-gusseted bottom; or (b) sealing the folded bottom on each side (of the vertical central axis of the container) at equal acute angles in the range from about 30° to 60° to the horizontal, each sealing line angulated outwardly from the vertical central axis to form the desired gussets, and at the same time, to form a disruptable bond between the upwardly and outwardly angulated portions of each gusset. The unexpected benefit of wasting such a large portion of material is that the container formed is unique in that the printed portion continuously covers the exterior surface of the lower portion, and the upper essentially transparent upper portion is free from any portion of the printed design appearing in the lower portion; additionally, it allows the formation of a bottom gusset as described herein, which gusset could not be made in containers made in a "waste-free" production line. A single web is printed symmetrically about its central longitudinal axis, and folded double before heat-sealing its printed oppositely angulated sides to provide a profile in the lower portion which includes an outwardly-flared portion.

A method for forming a container for a flower pot comprises, feeding first and second webs formed by folding a web double, each of said webs having untreated inner surfaces in contact with each other, and imprinted outer surfaces thermally sealable synthetic resinous film each web from a pair of spaced apart feed rolls in unspaced-apart overlapping relationship over a lateral support surface, each web being in the range from 0.5 mil (12.5μ) to 2 mil (50.8μ) thick and having continuously imprinted, in overlapping lower printed portions thereof, an ornamental decorative design of contrasting bright colors; maintaining constant tension over the length of each web as the webs travel over the support surface; continuously advancing the webs longitudinally along the support surface; interrupting the webs on the support surface to stop them at predetermined intervals without interrupting feeding of the webs from a pair of feed rolls; heat-sealing the webs together to provide a water-impervious bottom for the container, and, along equally angulated but oppositely directed side edges which include an outwardly-flared portion in the container's exterior lower portion, to provide the exterior of the lower portion with a printed, smoothly planar surface uninterrupted by an elongated blank rectangle at a side margin in the lower portion, and, to provide an upper see-through portion free from any portion of printing present in the lower portion; discarding material intermediate sequentially heat-sealed containers, this material being in an amount more than one-half that required to form the container; and, collecting a mass of individual and separate containers.

In the particular instance where the air circulation is desired over the product, as when a container is used to hold a live plant, the method comprises, in addition, perforating the essentially light-permeable upper portion with sufficient through-perforations to provide circulation of ambient air though the upper portion, and, optionally, a series of lateral, closely spaced perforations, generally coincident with the lateral line, resulting in a weakened tear-off line to facilitate separating the transparent upper portion from the printed lower portion, if so desired, but not weakened sufficiently to tear off under the weight of the container and its contents when grasped by its upper portion.

It is surprising that a trapezoidal container formed with perforations, as described, from thermoplastic heat-sealable film in the range from 0.5 mil to 1.5 mils thick, when perforated with a series of generally lateral, closely spaced slits, withstands the forces generated by manually lifting the container filled with the desired contents, by grasping the container's upper portion, without tearing it, yet permits that upper portion to be torn away when desired.

It is also surprising that a container may be provided with a hexagonal gusset dimensioned to snugly fit under a flower pot's base and provide opposed triangular portions which inconspicuously conform to the arcuate surface of the pots lower portion.

BRIEF DESCRIPTION OF THE DRAWING

The foregoing and additional objects and advantages of the invention will best be understood by reference to the following detailed description, accompanied with graphical illustrations of the preferred embodiments of the container and the process for making it, in which illustrations.

DETAILED DESCRIPTION OF PREFERRED EMBODIMENTS

Figure 1:
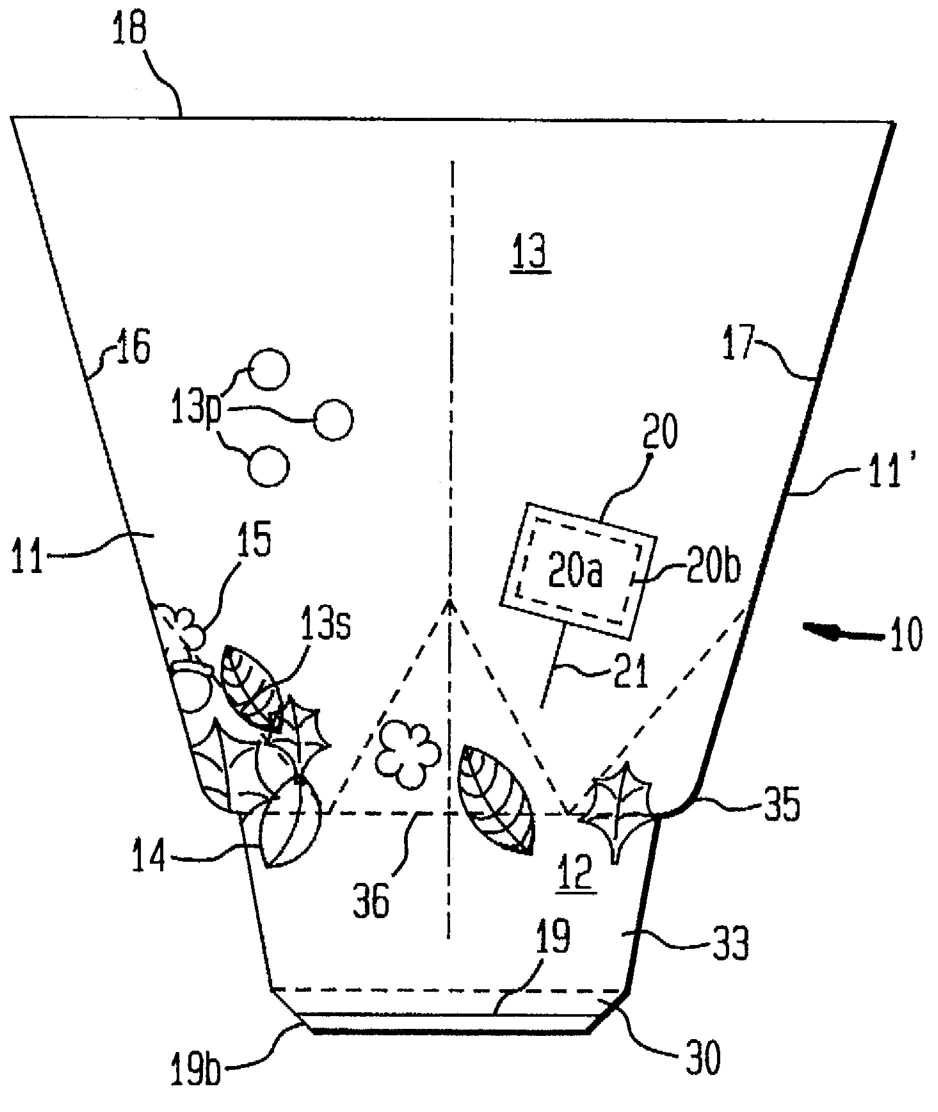
FIG. 1 is a plan view illustrating, in a flattened disposition, a container of functionally printed film, to hold a frustoconical flower pot; the lower portion is outwardly flared and slits for serrations are provided laterally, to tear away the upper portion manually, if desired; perforations for air circulation are provided in the upper portion if a live plant is potted; the lower printed portion comprises different thicknesses and/or intensities of one or more printing inks, and the lower printed portion is free from a "racing stripe"; the upper portion is substantially clear film, free from "overlap". In side elevation, the container appears as a line because the film is nominally designated as being less than 2 mils thick.

Referring to FIG. 1 there is shown a flattened container indicated generally by reference numeral 10 which in plan view, is trapezoidal, comprising, coextensively superimposed upper and lower panels 11 and 11' respectively, of essentially equal area, only the front (or upper) panel 11 being visible in this view. Each panel has a lower portion 12 which is printed and an upper portion 13 separated laterally by line 15 (the printing is shown with a serrated profile) drawn laterally along the top of a printed design 14 of design elements including leaves and/or flowers. The upper portion 13 is essentially transparent and imperforate when it contains an inanimate plant, but is provided with perforations **13*p* to permit a live plant to breathe, referred to as "breathing holes". In addition to the breathing holes, the container may be provided with a single set of closely spaced slits 13*s*, to provide a desired serrated or crenelated profile of upstanding projections, viewed in side elevation, when the upper portion 13 is torn away. As shown, the printing is tightly bounded by the serrated line and slits 13*s*, but in practice, the serrations typically extend into the printed portion since it is difficult to control the superposition of serrations and printing accurately. When such slits are provided, it is critical that the spacing of the slits be such that the upper portion 13** will not tear away from the lower portion when the upper portion is gasped to lift the container with its contents. This spacing will vary depending upon the particular choice of contents, but with a typical living plant in a container snugly fitted over a conventional 15.25 cm flower pot having a bottom diameter of 11 cm, the slits have essentially no width, but are in the range from 5 mm to 20 mm long, preferably from 12–16 mm long, and are spaced apart in the range from about 3 mm to 5 mm apart.

Identification of the plant to be contained and instructions for its care are stated on a marker 20 printed against the transparent upper portion 13. Like the design in the lower printed portion, the marker is printed in contiguous contrasting colors, the border **20*b* being of a different color, or thickness relative to the layer 20*a* within the border, the inks being chosen to provide a high-gloss. As illustrated, the marker 20 is printed atop a narrow support 21** to provide the visual impression that the label is on a stake planted in the pot contained therein. No portion of the upper portion is printed with the design covering the lower printed portion, and except for the marker, only the lower printed portion is typically covered with high gloss ink, preferably in at least two, and up to four layers.

Each panel 11 and 11' has a pair of equally angulated but oppositely directed side edges 16 and 17 which are joined in a thermally formed adhesive-free linear seal or weld which is liquid-impervious; and each panel has opposed, parallel, spaced-apart upper and lower sides 18 and 19, only the shorter (lower) sides of which are also thermally heat-sealed (welded) without using an adhesive, to provide a planar bottom edge **19*b*. A transition zone 30 is formed after the pot is inserted. As shown, the lower portion 12, includes the transition zone 30 with its planar edge, a smooth-surfaced frustum 33 and the outwardly flared portion 35 in which each side flares outward starting near the pot line 36 shown in dotted outline. Not shown is the longitudinal strip above the upper sides 18 which is typically provided to allow a multiplicity of containers to be packaged for being easily dispensed. The upper sides 18 provide smoothly laminar edges which form the mouth of the container. Typically and preferably, the bottom edge 19*b*** is formed in an unprinted portion of each web to effect a more reliably impervious seal than if the seal was effected in the printed portion.

Upon distending the mouth of the container 10 by inserting a flower pot, the printed images are continuously displayed around the circumferential exterior smooth surface of the frustum with only opposed angulated lines along and above the frustum being visible where the edges of the panels were heat-sealed.

The illustrated design 14 comprises an image of a profusion of leaves and flowers printed in dark and lighter colors, the central mass of a portion of the design in a thin layer of colored ink indicated by **14*a*, and its boundary region indicated by a thicker layer 14*b* of the same ink (FIG. 1**A).

The container is preferably made from film from 1.0 mil to 1.5 mils thick, provided the film is essentially transparent and it can be printed with varying thicknesses of colored inks, and more preferably can have a layer of bright metal about 1μ thick deposited on the film before it is printed. Most preferred films are polyolefins, particularly polyethylene and polypropylene; polyesters, particularly polyethyleneterephthalate; and, nylons all of which are well known in the art to be amenable to be printed as required above. Most preferred bright metal for deposition is aluminum, though copper, silver and gold may be used. The process for depositing the metal and overprinting with ink is known and practiced according to the teachings of patents assigned to Beckett Industries, Gravure International and Solar Press Inc. The process of depositing the metal on the film forms no part of this invention.

As is also well known, small goods are conventionally packaged in containers or bags which are cylindrical when filled, or which are rectangular parallelpipeds, because they provide efficient use of shipping volume. Incidental to presenting the volume of small goods more decoratively but less economically than in a cylindrical or rectangular parallelpiped, it is essential that aesthetic proportions of the container not be vitiated. To provide such aesthetic proportions, the shorter side (the bottom) is at least 5 cm, though it may be as wide as 25 cm; and that the remaining dimensions of the container be chosen from within the ranges, or, ratios in the ranges given below: the angle θ is in the range from 70° to 85° to the horizontal; the lateral line 15 providing demarcation between the upper and lower portions 13 and 12 respectively provides printing in an area which extends in the range from above 50% to about 65% of the vertical height, that is, the distance between the bottom 19 and the upper side 18 of the trapezium; the overall height of a trapezium is determined by the ratio of the length of the upper side 18 to lower side 19, and is at least 2:1, generally being in the range from 2:1 to about 5:1.

A characteristic of the container having appropriate dimensions in the foregoing ranges is that if it is used to hold pulverulent soil for growing a living plant without a flower pot, the soil-filled container in which the transition zone 30 is also filled, when placed on its bottom on a planar surface, is unstable because it has no structural support.

Figure 1A:
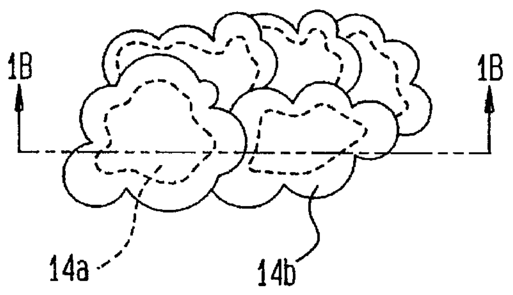
FIG. 1A is a detail, front elevational view, about actual size, of a section of a portion of the film printed on its exterior surface, illustrating the contiguous layers of different colors or thicknesses of high-gloss ink providing relatively dark and light colors to identify the contents as being a plant; the colors are printed in opaque inks to provide a brightly luminescent lower printed portion in which there is no visible unprinted portion.

Referring to FIG. 1A there is shown in detail a printed section of cast polypropylene film 31 of a panel 11, in which annular boundary regions **14*b* in individual design elements, lying in the area between the dotted lines within each design element and its periphery, are printed in a greater thickness of opaque ink than that of the central portion 14*a*** bounded by the dotted line. The mass of ink representing each design element is in different thicknesses of the same or different inks which absorb all wavelengths in the visible range except for those which provide the desired contrasting colors.

Figure 1B:
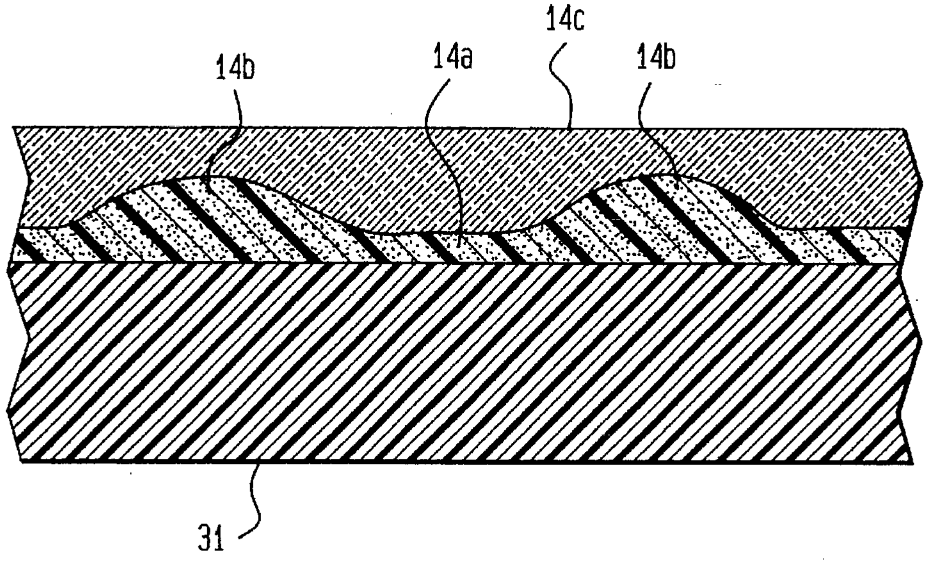
FIG. 1B is a detail of FIG. 1A, greatly enlarged to show details of a single portion of printing as viewed from the bottom along the line 1B—1B, looking in the upward direction indicated, so as to see the edge of the film, and a portion of the printed contiguous colors on the exterior surface of the film.

Referring to FIG. 1B there is shown in detail an elevation view of film section 31 with portions broken away, showing its exterior surface coated with an opaque layer of ink **14*a*, coated in a thickness less than that of a second layer of opaque ink 14*b*. If these inks have the appropriate amount of varnish mixed therein, they will meet the required high-gloss of at least 70. If they do not meet the requirement, a layer of varnish 14*c*** is overlaid on the printed image.

Figure 1C:
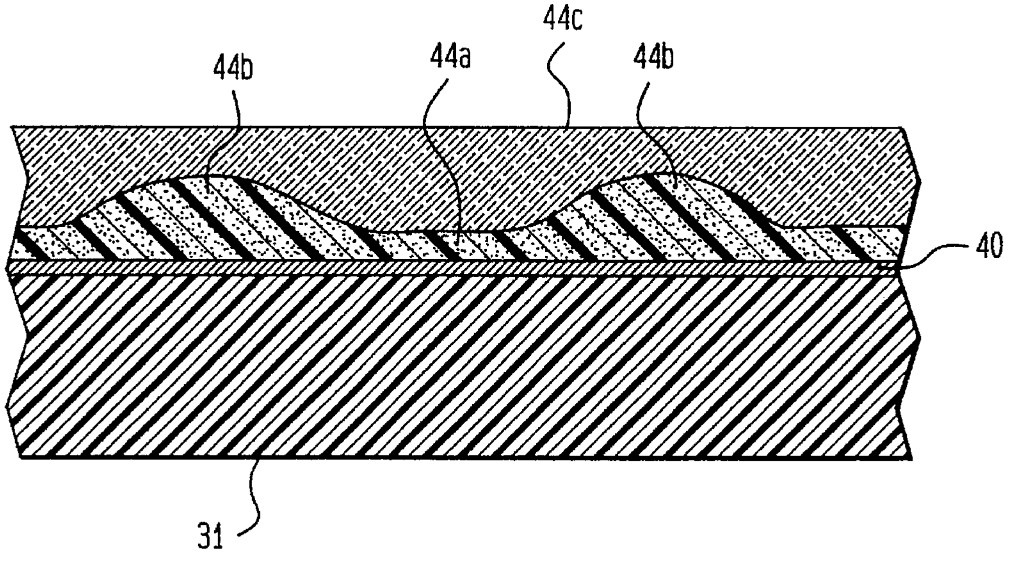
FIG. 1C is a detail again greatly enlarged as in FIG. 1A, illustrating an ultrathin layer of bright metal deposited on the exterior surface, and printed with transparent inks.

Referring to FIG. 1C there is shown a section of another panel 31' with portions broken away, showing its exterior surface coated with an ultrathin bright layer 40 of aluminum metal. Printed on the bright layer is a transparent layer of ink **44*a* in a thickness less than that of a second layer of transparent ink 44*b*. If these inks have the appropriate amount of varnish mixed therein, they will meet the required high-gloss of at least 70. If they do not meet the requirement, a layer of transparent varnish 44*c*** is overlaid on the printed image.

Since the metal-deposition step results in a bright layer of metal over the entire surface of the printed web, the metal must be removed from those areas where the film is to result in the transparent upper portion of the container. To do this, the metal-coated printed web is overprinted with a resin in the form of a varnish which is inert and insoluble, in only those portions where the printing is to survive. The resin-coated web is then immersed in a metal etchant and the metal is etched away leaving the resin-coated printing. If desired, the resin is then removed by dissolving in a suitable solvent which does not dissolve or react with the printing ink. Though the process of removing deposited metal is known, the printed web, printed as stated herein, and overlaid with metal only in the lower printed portion, has never been suggested in the prior art.

Figure 2:
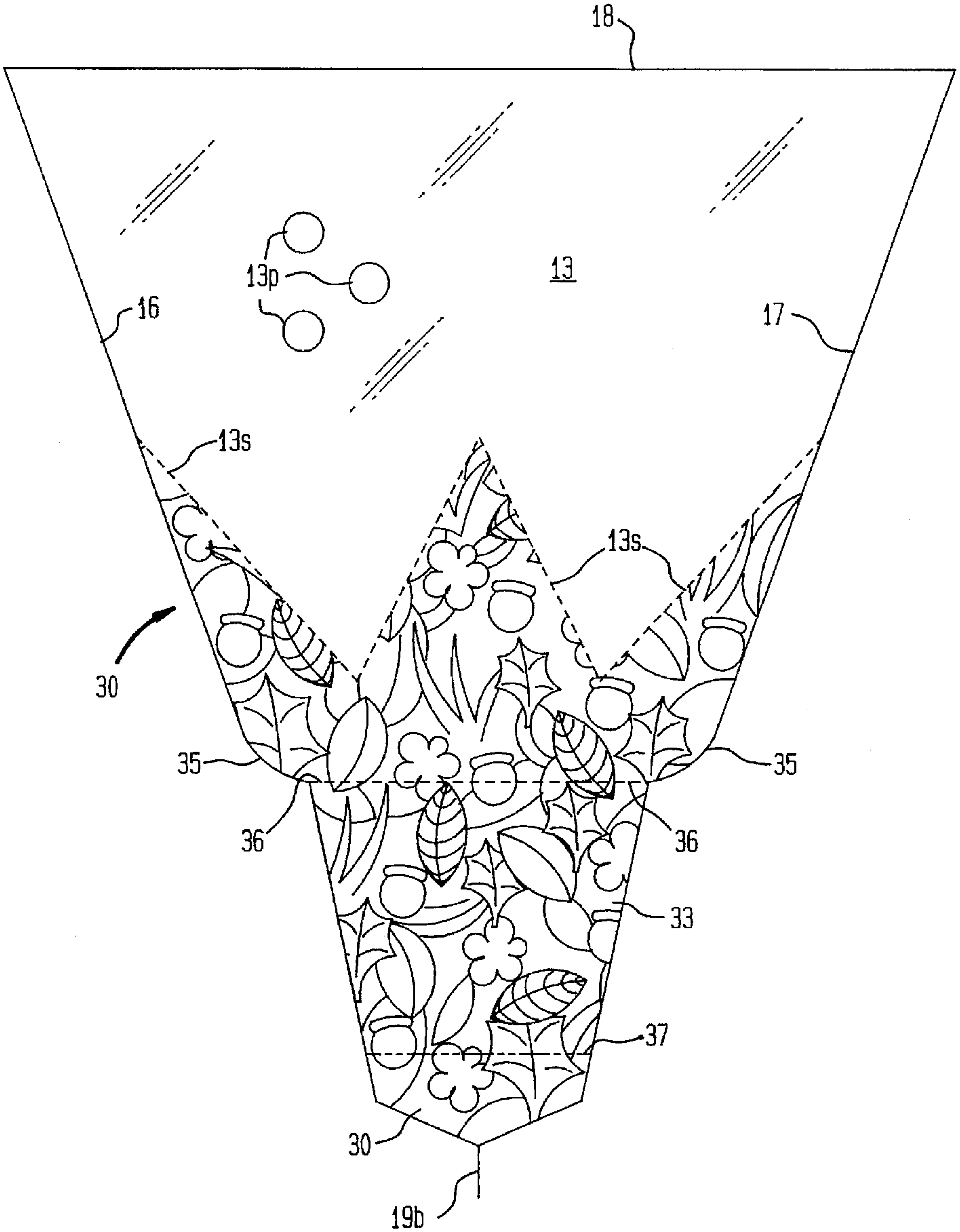
FIG. 2 is a side elevational view of the container shown in FIG. 1, which, after the flower pot is snugly sheathed in the lower portion, forms a smooth surface on the frustum of a cone terminating in an empty transition zone under the pot.

Referring to FIG. 2 there is shown a side elevational view of the container shown in FIG. 1 after sheathing the flower pot and forming the frustum. The transition zone 30 includes that portion of the lower printed portion 12 still maintaining a continuing conical form but progressing downward into the form of a V-shaped trough which terminates at its apex at the bottom planar edge **19*b*. The vertical height of the transition zone 30 from its apex to the bottom of the pot shown in dotted outline at 37 is necessarily less than 50% of the diameter of the bottom 51**, preferably in the range from 20 to 40%, or the transition zone is ineffectively concealed. Thus it will now be evident that the dimensions of the transition zone is critically related to the size of the flower pot snugly sheathed within it. This formation of a concealable transition zone is best provided by a flower pot having a bottom which is about one-half the area of its open top.

Figure 3:
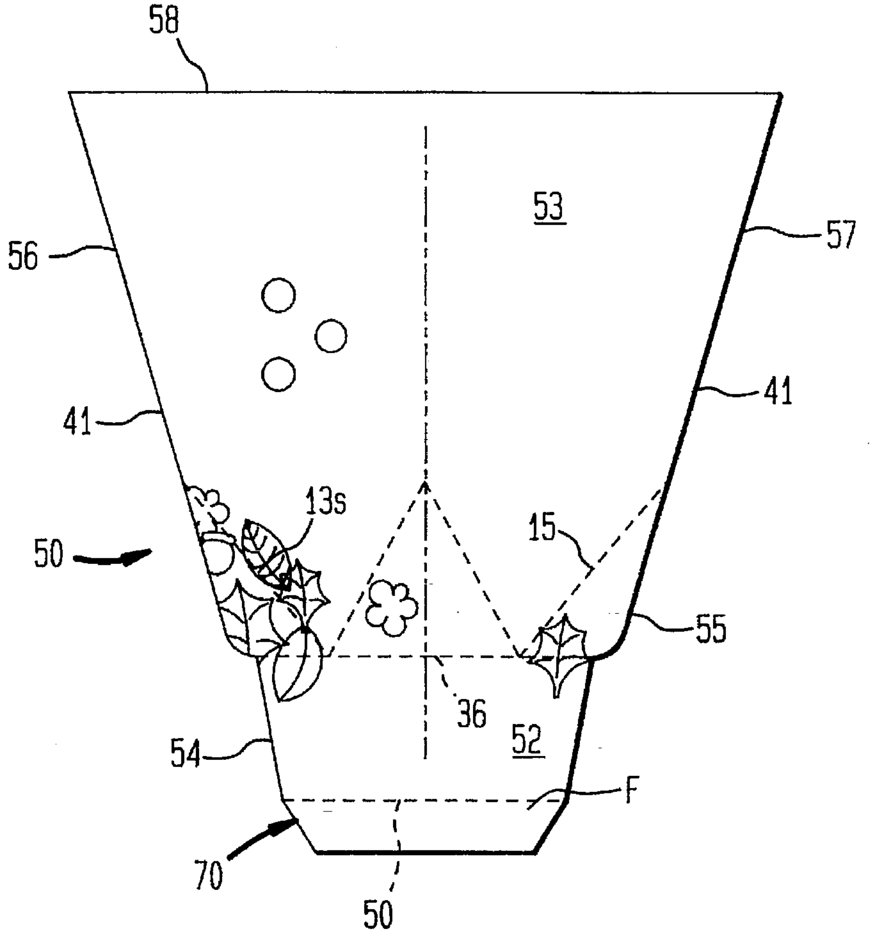
FIG. 3 is a plan view of a second embodiment of the container showing a flat container with a gusseted bottom, the lower portion printed with a single thickness, but preferably plural thicknesses of ink.

Referring to FIG. 3 the embodiment of the container in flattened disposition has upper and lower panels 41 and 41' respectively, formed by a web being folded double. Perforations **13*p* are provided in see-through portion 53 which is analogous to the upper see-through portion 13 of the non-gusseted container shown in FIG. 1; as before, the printed design, which may be of a single color or multiple colors, is in the lower portion 52 separated therefrom along a jagged line 15 and preferably provided with slits 13*s* in a serrated pattern. The lower portion 52, includes a smooth-surfaced frustum 54; outwardly flared portion 55 in which each side 56 and 57 flares outward starting near the pot line 36 shown in dotted outline; and, a base indicated generally by reference numeral 70. The upper sides 58** of the folded web provide smoothly laminar edges which form the mouth of the container.

Figure 3A:
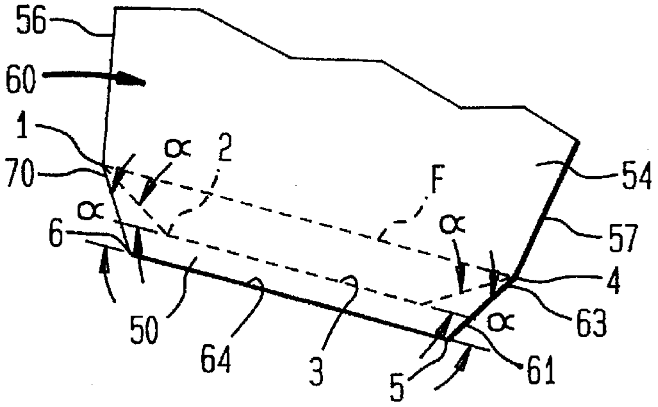
FIG. 3A is a perspective view of a portion of the lower portion of the container showing the formation of the gusset wherein the gusset is internally folded, but the opposed sides thereof are spread apart to show how the gusset connects the upper and lower panels.

Referring to the perspective view in FIG. 3A, there is shown a detail of the base 70 and gusset 60 formed by a wheel or finger of a conventional gusset-making machine which wheel thrusts the fold-line of the folded web (which forms panels 41 and 41') inwards between the panels 41 and 41' to form an internal fold the inner edge of which lies along line F. In the base 70, upper and lower panels 41 and 41' are connected by the gusset 60 which extends continuously across the bottom of the pot, and the triangular opposed end portions of the gusset cover opposed portions (the lower portion) of the frustum 54. Equally angulated, but oppositely directed hot dies simultaneously permanently weld the bottom of upper panel 41 to the internally folded web along the lines 1,6 and 4,5 on one side; and, on the other side of the internal fold, the dies weld the bottom of lower panel 41' along lines 1,2 and 4,5. The pairs of diagonally oriented heat-seals weld the web only on either side of the gusset, and not across any portion of it. It is critical that the welds on each side of the flattened bag be equally angled, and that the angles $\alpha$ of each weld to the horizontal is essentially the same, so that the line along each weld will intersect at the center line. The angle $\alpha$ is in the range from 30° to 60°, more preferably from 35° to 55°. Thus there is concomitantly formed a pair of essentially identical trapezoidal gusset panels 61 and 63 (so referred to because they are each in congruent relationship with the gusset folded axially along line F) that are in one-piece integral relation with the upper 41 and lower 41' panels, and with the gusset 60 which has a generally hexagonal area the boundary of which is defined by connecting points 1,2,3,4,5,6 (this numbering being clockwise). In flattened disposition, gusset panel 61 defined by the area between points 1,4,5,6 clockwise, has substantially the same area as one-half of the gusset 60. Similarly gusset panel 63, defined by connecting points 1,2,3,4 clockwise, has substantially the same area as one-half of the gusset 60. The continuous transition between panel 61 and gusset 60 occurs in along a fold 64 on the bottom; and that between panel 63 and gusset 60 occurs along a fold 66 on the bottom.

In addition to gusset panels 61 and 63 being permanently welded along their trapezoidal side edges 1,2 and 6,1 on one side, and 3,4 and 4,5 on the other, the panels 61 and 63 are disruptably bonded, along the same weld line made at one and the same time. Each weld line is made diagonally to extend from the bottom edge of each gusset panel 61 and 63, to adjacent the bottom of the side seam weld-line of panels 41 and 41' on either side. The disruptable bond must be broken to provide the gusseted bottom and this is easily done when a pot is inserted in the container. As explained above, the weak bond between treated and printed outer surfaces is formed because the effectiveness of the heat seal between untreated surfaces is vitiated by the treated or printed outer surfaces.

The area of the gusset formed is chosen such that the gusset lies flat against a planar surface when the pot in the container is placed on the surface, and triangular portions of the gusset are pressed against the lower portion of the pot. On one side, a triangular portion is defined by the area obtained by connecting points 1,2,6; and on the other side, the area obtained by connecting points 3,4,5. The area of gusset 60 is therefore related to the dimensions of the frustoconical pot which is to be sheathed and for a snug fit around the pot, the area may be mathematically determined. For a container, in flattened disposition, for a typical 4" (10 cm) nominal diameter pot, the length 1,4 is about 13.4 cm (5.25"), and the height of the fold-line F from the bottom edges 64 and 66 of each panel, respectively, is about 2.54 cm (1"); and for a typical 6" (15.25 cm) nominal diameter pot, the length 1,4 is about 21.3 cm (8.375"), and the height of the fold-line F from the bottom edges 64 and 66 of each panel, respectively, is about 4.5 cm (1.75").

The height of the frustum 54 in the lower portion 52 depends upon the height of the pot and that of the particular portion of the frustum of the pot which is to be slidably sheathed. For a typical 4" (10 cm) nominal diameter pot, the vertical distance between fold-line F and the pot line 36 (FIG. 3) is about 5.9 cm (2.3"); and for a typical 6" (15.25 cm) nominal diameter pot, the vertical distance between fold-line F and the pot line 36 (FIG. 3) is about 6.35 cm (2.5"). For any pot having a commonly used nominal diameter, each manufacturer of the pots provides differing overall dimensions. As a result, the foregoing dimensions will change depending upon the snugness of the fit desired.

The outwardly flared portion of the container is optional, being provided for visual effect. In general an upwardly concave radius is provided near the pot line, the radius being chosen so as to merge smoothly into a linear portion of upper portion 53 which linear portion has an acute angle to the horizontal which is about the same as, and preferably not greater than, the angle formed by a side of the frustum 54.

Figure 4:
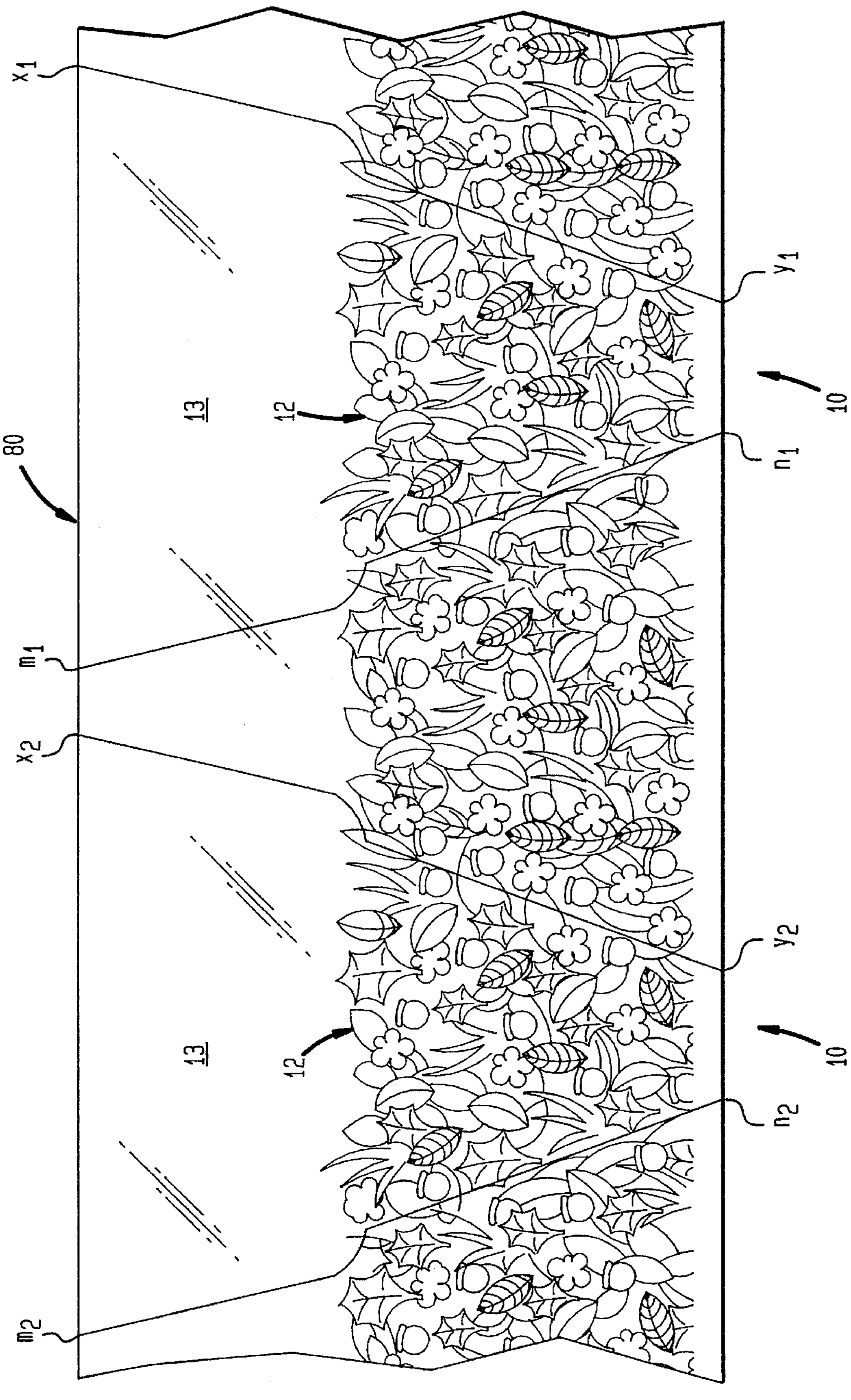
FIG. 4 is a plan view, with ends broken away, of one of two webs of film, each of which is continuously printed longitudinally in only one longitudinal portion, so as to superimpose one printed portion upon the other, illustrating how the webs are cut and sealed as congruent trapezoidal panels to form the non-gusseted container, and wasting the portion of each web between successive containers formed.

Referring to FIG. 4 there is shown a portion of a web of printed film 80 having a clear upper portion 13 and a printed lower portion 12. If desired, the clear portion 13 may be printed with glyphs, logos and the like, typically in an ink of color different from that used in the lower portion 12. The web is used to make a first container 10 by hot-wire sealing and cutting along the side edges $x_1y_1$ and $m_1n_1$, and along the bottom boundary of the printed portion between $n_1$ and $y_1$; and, by indexing the webs in the longitudinal direction, to make a second container 10 by hot-wire sealing and cutting along the side edges $x_2y_2$ and $m_2n_2$, and along the bottom boundary of the printed portion between $n_2$ and $y_2$. As a result, the webs defined by $m_1n_1y_2x_2$ are wasted, the amount of waste being minimized by having $x_2$ as dose to $m_1$ as is practical; but the containers formed are free from racing stripes and overlap.

An example of the amount of waste in the production of each container for a typical 15.25 cm flower pot, is approximately as follows: the bottom sealed edge is 11.5 cm, the open top is 48.25 cm and the open tops are sealed 2.5 cm apart, so that two panels of web, each 2.5 cm×40 cm is wasted. The largest container may be made with a web about 48" wide (1.22 meters) to have a base in the range from about 15 cm to 30 cm in length for large plants such as calla lilies or a kangaroo paw plant; the smallest containers may be about 10 cm high and may have a base in the range as small as from about 2 cm to 5 cm.

The containers 10 are formed by intermittently advancing, in timed sequence, two webs, congruently, or a single web folded double, to form individual containers in a single heat-sealing station, or multiple stations where a hot wire is applied to the sides and bottom.

Figure 5:
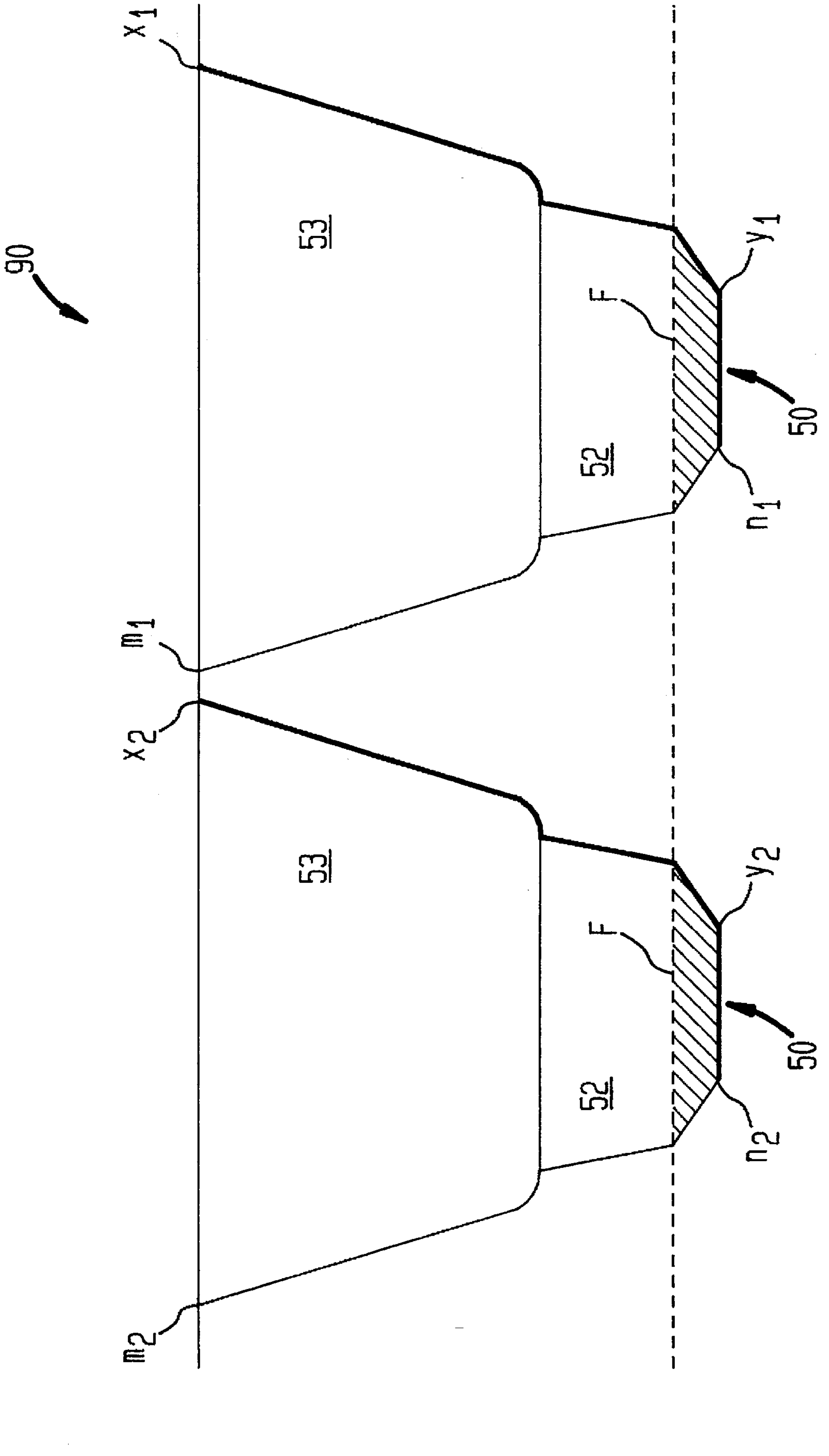
FIG. 5 is a plan view, with ends broken away, of one of a single web of printed film, folded double to form the gusseted bottom, again wasting the portion of each web between successive containers formed.

Referring to FIG. 5 there is shown a portion of a web of printed film 90 folded double so as to present a clear upper portion 53 and a printed lower portion 52 which provide the upper and lower panels of the container. As the web moves from left to right, a fold along the bottom of the printed portion is tucked between the upper and lower panels 41 and 41' respectively (FIG. 3) with a wheel (not shown), the fold line F (shown in dotted outline) being at a predetermined distance from the bottom, this distance being chosen as a function of the size of the pot to be covered. As before, the containers 50 are formed by intermittently advancing, in timed sequence, the folded web to form individual containers in a single heat-sealing station, or multiple stations where hot wires (or hot dies) are applied along the profile of each side $x_1y_1$ and $m_1n_1$ respectively to form the container. The next container is similarly formed by sealing along the edges $x_2y_2$ and $m_2n_2$. The containers formed are collected in a mass, typically in a "pack" designed to be used by a commercial grower of plants or a florist.

The continuous seal thus formed along each profile on each side of the travelling web thus (i) removes the intermediate portion of the web defined by the area $m_1n_1y_2x_2$, and (ii) provides three congruent seals simultaneously. The intermediate portion is wasted.

The three congruent seals are as follows: first (from the top, sequentially) gusset panel 61 (FIG. 3) is permanently welded along its outwardly angulated edges to the inner folded web, the untreated inner surface of panel 61 being welded to the untreated surface of the folded web; second, the opposed printed surfaces of the fold are sealed; and third, the untreated inner surface of the folded web is permanently welded to the untreated inner surface of panel 63, all joined at the same angle. The gusset 60 is only formed after the seal between the opposed printed surfaces of the fold is broken.

Machines such as the Guard 200HS and the Lemo 850K or 850KS for producing the containers are available from Guard & Associates, Denver, Colo., M. H. Lehmacher & Son GmbH, Niederkassel-Mondorf, Germany, respectively, and other manufacturers of bag-making machines, such as FMC Corp., Roan and Arvar, and form no part of this invention. Machines to execute the operations described hereinabove are commercially available upon order.

I claim:

1. A fastener-free, non-closable container for a potted plant, said container comprising, a pair of decorative flexible self-supporting laminar panels having substantially the same size and shape, one congruently disposed relative to the other and joined at their sides with water-impervious joints, said sides being equally angulated but oppositely directed so as to form a generally trapezium shape; each said panel being a portion of a web of thermally sealable synthetic resinous film divided by a generally lateral line defining therebeneath, a lower portion having an exterior surface upon which essentially no unprinted portion remains, said lower portion including (i) a base on which the bottom of a pot rests, and (ii) a frustoconical portion which snugly jackets the pot, and thereabove, an essentially transparent upper ("see-through") portion, said lateral line being located in a region in the range from about one-half to about two-thirds vertically above said container's bottom; said base including a hexagonal gusset formed by an inward fold of said lower portion inserted for a predetermined distance related to said pot, and sealed at equal but oppositely directed acute angles, each sealing line angled outwardly from the vertical central axis to form an acute angle with the horizontal in the range from 30° to 60°, said gusset providing opposed triangular portions which lie conformingly on said pot's lower surface.

2. The container of claim 1 wherein said lower portion includes an outwardly-flared portion commencing to flare near the rim of the pot, said outwardly-flared portion merging into said see-through portion.

3. In a fastener-free, non-closable container for a potted plant, said container comprising, a pair of decorative flexible self-supporting laminar panels having substantially the same size and shape, one congruently disposed relative to the other and joined at their sides and bottom with water-impervious joints, said sides being equally angulated but oppositely directed so as to form a trapezium; each said panel being a portion of a web of thermally sealable synthetic resinous film divided by a generally lateral line defining therebeneath, a lower printed portion having a brightly colored appearance, and thereabove, an essentially transparent upper ("see-through") portion, said lateral line being located in a region in the range from about one-half to about two-thirds vertically above said bottom; said container having a single cavity and an exterior surface only said lower portion of which is essentially completely covered with high-gloss printing ink; said lower portion having an exterior surface upon which essentially no unprinted portion remains, said lower printed portion comprising regions of contrasting colors, printed with glossy inks, each region having a thickness different from another contiguous region, each region comprising from one to three layers of priming ink superimposed one upon the other, each when dry, having a thickness in the range from 1μ to 10μ, and including sufficient varnish to provide multiple colors of varying intensity providing a gloss index in the range from about 70 to about 98, the improvement comprising, said lower portion including (i) a base on which the bottom of a pot rests, (ii) a frustoconical portion which snugly jackets the pot, and (iii) an outwardly-flared portion commencing to flare near the rim of the pot, said outwardly-flared portion merging into said see-through portion.

* * * * *